United States Patent [19]

Pettersson

[11] 4,305,171
[45] Dec. 15, 1981

[54] DEVICE FOR SECURING A FABRIC MATERIAL TO A SUPPORT SURFACE

[76] Inventor: Klas A. Pettersson, Läggestavägen 16, S-124 31 Bandhagen, Sweden

[21] Appl. No.: 82,517

[22] Filed: Oct. 9, 1979

[30] Foreign Application Priority Data

Oct. 9, 1978 [SE] Sweden ............................... 7810551

[51] Int. Cl.³ .............................................. B63B 17/00
[52] U.S. Cl. ......................................... 9/1.5; 24/202; 24/217 R
[58] Field of Search ................ 24/104, 107, 108, 202, 24/216, 217 R; 9/1.5; 135/6

[56] References Cited

U.S. PATENT DOCUMENTS

| | | | |
|---|---|---|---|
| 1,904,122 | 4/1933 | Chapman | 24/217 R |
| 2,342,832 | 2/1944 | Borchers | 24/217 R X |
| 2,440,685 | 5/1948 | Huelster | 24/217 R |
| 2,937,652 | 5/1960 | Zimmer, Jr. et al. | 9/1.5 X |
| 3,213,507 | 10/1965 | Christian et al. | 24/217 R |

*Primary Examiner*—Sherman D. Basinger
*Attorney, Agent, or Firm*—Sughrue, Mion, Zinn, Macpeak and Seas

[57] ABSTRACT

A device for securing a piece of fabric (1), such as a boat cover, to a support surface (2) comprises a mounting element (16, 17) arranged on the support surface, and a two-part element (4, 11) fixedly attached to the fabric and arranged to co-act with the mounting element. The element (4, 11) comprises a front and a back part arranged to clamp the fabric therebetween. To facilitate the dismantling of the element (4, 11) its parts are held together by a snap action. One of the parts comprises a base plate (4) having at least two resilient walls (5, 6) which project outwardly perpendicular to the plane of the plate and which pass through an opening in the fabric and then snap into an opening in the part located on the other side of the fabric.

3 Claims, 4 Drawing Figures

DEVICE FOR SECURING A FABRIC MATERIAL TO A SUPPORT SURFACE

The present invention relates to a device for securing a piece of fabric, such as a boat cover, to a support surface, said device comprising a mounting member arranged on the support surface and an element which is fixed in said fabric and which is arranged to co-act with said mounting member, said element comprising a forward and a rearward part between which said fabric is firmly clamped.

Normally, boat covers are today secured by means of eyelets arranged on the cover and passed over rotatable stud-like elements fixed on the boat. In some cases, robust press-studs are also used.

In both cases the elements fixed to the cover comprise two parts which are riveted together with the fabric firmly clamped therebetween. Such securing elements readily cause damage to the fabric, however. For example, when the cover is stretched, high tension forces occur at the edges of the holes formed in the cover when fitting said securing elements thereto, causing the fabric to tear or split. In addition to this known fabric securing devices of this kind also have the disadvantage that repair work is both difficult and time consuming, because the two parts of the securing element fixed to the fabric are riveted together and thus not readily removed. Further, the assembly of these devices is relatively time consuming.

The object of the present invention is to provide a device of the kind mentioned in the introduction in which the aforementioned disadvantages are eliminated.

This is achieved in accordance with the invention by the fact that the two parts of the securing element fixed to the fabric are arranged to be connected together by a snap-action, thereby making it easy to separate them. Since the element can, in this way, be readily removed from the fabric, repair work is made much simpler. At the same time, risk of damaging the fabric is considerably reduced.

A device according to the invention is characterised in that one of the parts of the securing element fixed to the fabric material comprises a base plate having at least two resilient walls which project outwardly, substantially perpendicularly to the plane of the base plate, said walls being arranged, when fixing the element to the fabric, to be inserted through a hole formed therein; and in that the other of said parts comprises a plate having an opening the sides of which are arranged to snap over said walls.

Preferably, said walls are arranged on the base plate along two mutually opposing edges of an opening formed in said plate, said opening being arranged when securing the fabric to a mounting member to receive a projection extending outwardly from said element, said projection being arranged to fit snugly into said opening. The base plate may also be provided with a third resilient wall arranged, when securing the fabric to said support surface, to resiliently clamp a hook-shaped projection arranged on the mounting element in a respective one of said openings.

The aforementioned snap-action between the two parts is conveniently obtained by providing at least the first mentioned walls with flanges at the upper edges of said walls, which flanges snap over the edges of the opening in said second part.

For the purpose of reducing tension at the edges of the hole formed in the fabric, one of said parts is conveniently provided with at least one recess and the other of said parts is provided with at least one projection which projects into said recess as the two parts of the securing element are pressed together with the fabric located therebetween.

The invention will now be described in more detail with reference to the accompanying drawings.

Figure 1:
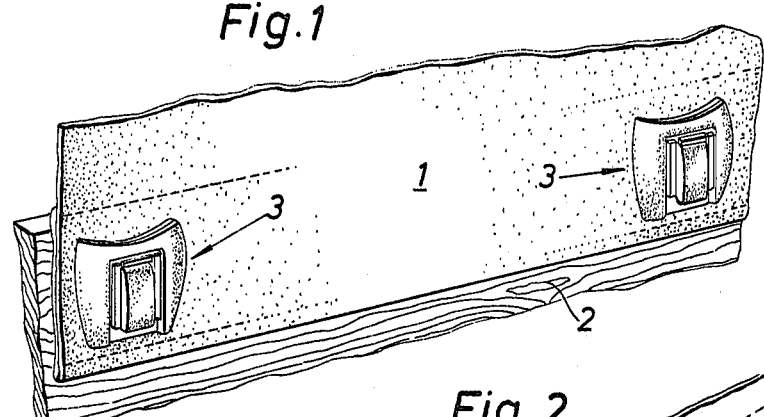
FIG. 1 illustrates part of a piece of fabric firmly mounted on a support surface by means of devices constructed in accordance with the invention.
Figure 2:
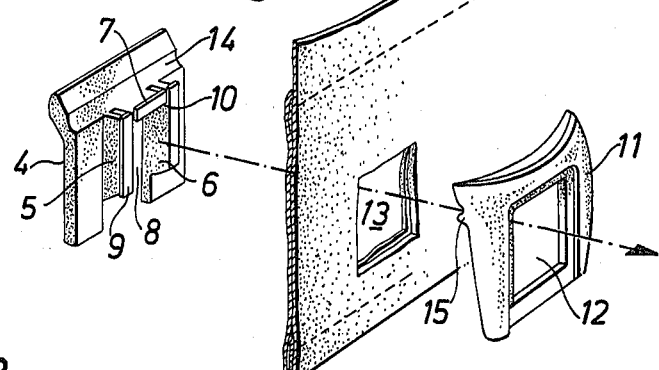
FIGS. 2-4 illustrate a securing device of the kind used in FIG. 1, said device being illustrated in the various stages of its attachment to said fabric.
Figure 3:
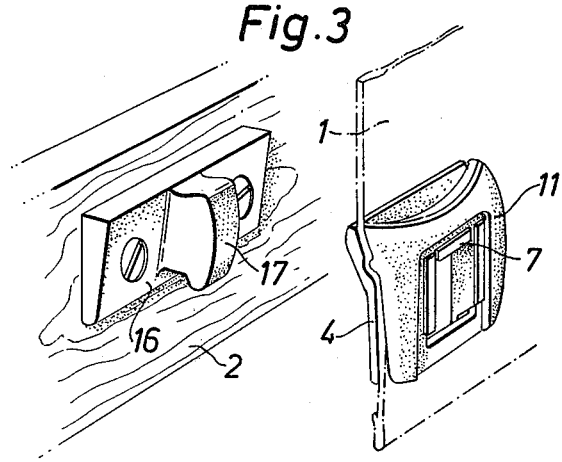
Figure 4:
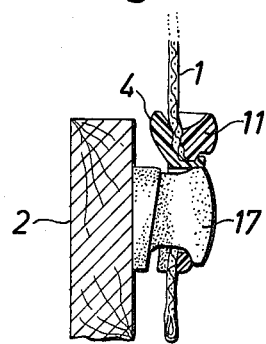

In FIG. 1 there is illustrated a fabric material 1, e.g. a boat cover, which is secured to a support surface 2 by means of securing devices 3, said devices being illustrated in more detail in FIGS. 2-4.

As will be seen from FIG. 2, the mouth-like securing element fixed to the fabric 1 comprises two parts, of which one comprises a rear plate-like part 4 having three walls 5-7 which project outwardly substantially perpendicularly to the plane of the plate and which are arranged along the edges of an opening 8 formed in said plate 4. All of the walls 5-7 are resilient and at least the side walls 5 and 6 are provided along their upper edges with outwardly projecting flanges 9 and 10 respectively. The part 11 arranged on the front side of the fabric comprises a frame-like plate having an opening 12.

For the purpose of attaching said element to the fabric 1, there is formed in said fabric an opening 13 through which the outwardly projecting walls 5-7 of the rear part 4 pass. The frame-like plate 11 is then pressed over the walls, it being necessary to press at least the side walls 5 and 6 slightly towards each other, to permit the flanges 9 and 10 to pass through the opening 12 in the plate 11. Immediately the flanges 9 and 10 have passed through the opening 12, the walls 5 and 6 spring outwardly, the flanges 9 and 10 snapping over the edges of the opening 12, to ensure locking of the two parts while clamping the fabric 1 firmly therebetween. The element can be fixed to the fabric relatively simply, and requires no special tools herefor. Said element can also be removed from the fabric without requiring special tools.

In order to prevent tension forces in the fabric when, for example, stretching the same from acting directly on the edges of the holes, the rear plate 4 is provided with an elongate recess 14 at its uppper edge, and the front plate 11 is provided with a corresponding ridge 15. As a result of the co-action between the recess 14 and the ridge 15, the fabric is effectively clamped in a region thereof in which it has not been weakened, by the threads of the fabric being cut when the hole or like is formed in said fabric and where consequently the fabric is relatively strong. Corresponding relief means can, of course, also be arranged on other sides of the element.

FIG. 3 illustrates the two parts shown in FIG. 1 in their assembled state, there being obtained a through opening which is arranged to receive a hook-shaped projection 17 on a tongue member 16 mounted on the support surface 2. The lower, nose-like part of the projection 17 is first caused to grip over the lower edge of the opening 12, whereafter the securing element can be readily snapped-in over the rounded part of the projection 17 at the upper edge by applying a light pressure.

This snap action is obtained as a result of the resilient cross wall 7 on the rear plate 4. Alternatively, the projection 17 may be provided with an upper resilient part.

FIG. 4 illustrates the two parts shown in FIG. 3 in an assembled state, corresponding to the position shown in FIG. 1. The attachment of a piece of fabric to a support surface by means of a device constructed in accordance with the invention can be effected very simply and in a single operation. The width of the hook-like projection 17 is such that said projection is a close fit in the opening 13 of the securing element, thereby further ensuring positive securement between the two parts 4, 11.

Both the element fixed to the fabric and the mounting element may comprise a suitable plastics material.

What is claimed is:

1. A fastener for securing a flexible sheet of fabric, such as a boat cover, to a support surface, the fastener comprising: a tongue member (16) adapted to be mounted on the support surface (2), and a mouth element adapted to be fixed through the fabric (1) and to cooperate with the tongue member, the mouth element comprising a front plate (11) and a rear plate (4) between which the fabric is clamped, the rear plate comprising a base member having an opening (8) therein and two separate resilient straight walls (5, 6) projecting outwardly from the base member substantially perpendicular to the plane thereof, one along each of two opposite edges of the opening, the walls incorporating locking means and passing through a hole (13) in the fabric which registers with the opening in the base member, and the front plate having an opening (12) therethrough which snap fits over the locking means on the walls, the locking means releasably holding the front and rear plates together so that the fabric is clamped therebetween, the tongue member having a projection (17) which passes through the opening in the base member, through the hole in the fabric and through the opening in the front plate in which the projections closely fits, and holding means (7) for retaining the projection in position when it has been passed through the openings and the hole, said locking means comprising flanges (9, 10) at the free outer edges of the walls, the flanges being adapted to snap away from each other over the edges of the opening in the front plate, and wherein one of the base member and the front plate has an elongate recess (14) and one of the front plate and the base member has a complementary shaped projection (15) which extends into the recess with a part of the fabric clamped therebetween when the front and rear plates are snap fitted together.

2. A fastener according to claim 1, wherein the tongue member projection is hook-shaped, and the holding means comprises a third separate resilient wall extending outwardly along another edge of the opening in the base member and arranged to resiliently clamp the projection in the opening in the base member.

3. A fastener according to claims 1 or 2, wherein the base member is U-shaped.

* * * * *